United States Patent
Kim et al.

[11] Patent Number: 5,946,296
[45] Date of Patent: Aug. 31, 1999

[54] RARE PROBABILITY CONNECTION CALL REGISTRATION METHOD FOR ASYNCHRONOUS TRANSFER MODE SWITCHING SYSTEM

[75] Inventors: Chul Soo Kim; Dong Guk Je; Jae Heum Lee, all of Daejeon, Rep. of Korea

[73] Assignees: Electronics amd Telecommunications Research Institute, Daejeon, Rep. of Korea; Korea Telecommunication Authority, Seoul, Rep. of Korea

[21] Appl. No.: 08/763,321

[22] Filed: Dec. 10, 1996

[30] Foreign Application Priority Data

Sep. 4, 1996 [KR] Rep. of Korea ............ 96-38261

[51] Int. Cl.$^6$ ............................................. H04J 12/56
[52] U.S. Cl. .................. 370/230; 370/236; 370/462; 370/522
[58] Field of Search ................... 370/229, 230, 370/242, 252, 395, 235, 236, 237, 462, 465, 522

[56] References Cited

U.S. PATENT DOCUMENTS 5,673,254  9/1997  Crayford .................. 370/236
5,704,047  12/1997  Schneeberger .......... 370/236

*Primary Examiner*—Min Jung
*Attorney, Agent, or Firm*—Antonelli, Terry, Stout & Kraus, LLP

[57] ABSTRACT

An improved rare probability connection call registration method which utilizes automatic congestion level (ACL) information within a release message for an asynchronous transfer mode (ATM) switching system. The method includes the steps of setting a predetermined threshold value, receiving a call releasing message, checking automatic congestion level (ACL) information in the call release message, and determining whether an ACL information is set. When the ACL information is not set continuous checks are made, and the method continues by increasing the count value when the ACL information is set, and it is determined whether the value of the ACL counter is greater than a predetermined threshold value. The method continues by registering a corresponding code as a rare probability connection call (RPCC) when the value of the counter is greater than the threshold value, outputting the corresponding code to an operator through an operator terminal, requesting call control with respect to the call request which is routed to the corresponding route, and clearing the value of the counter when the value of the counter is less than the threshold value after the measurement unit time has passed.

1 Claim, 4 Drawing Sheets

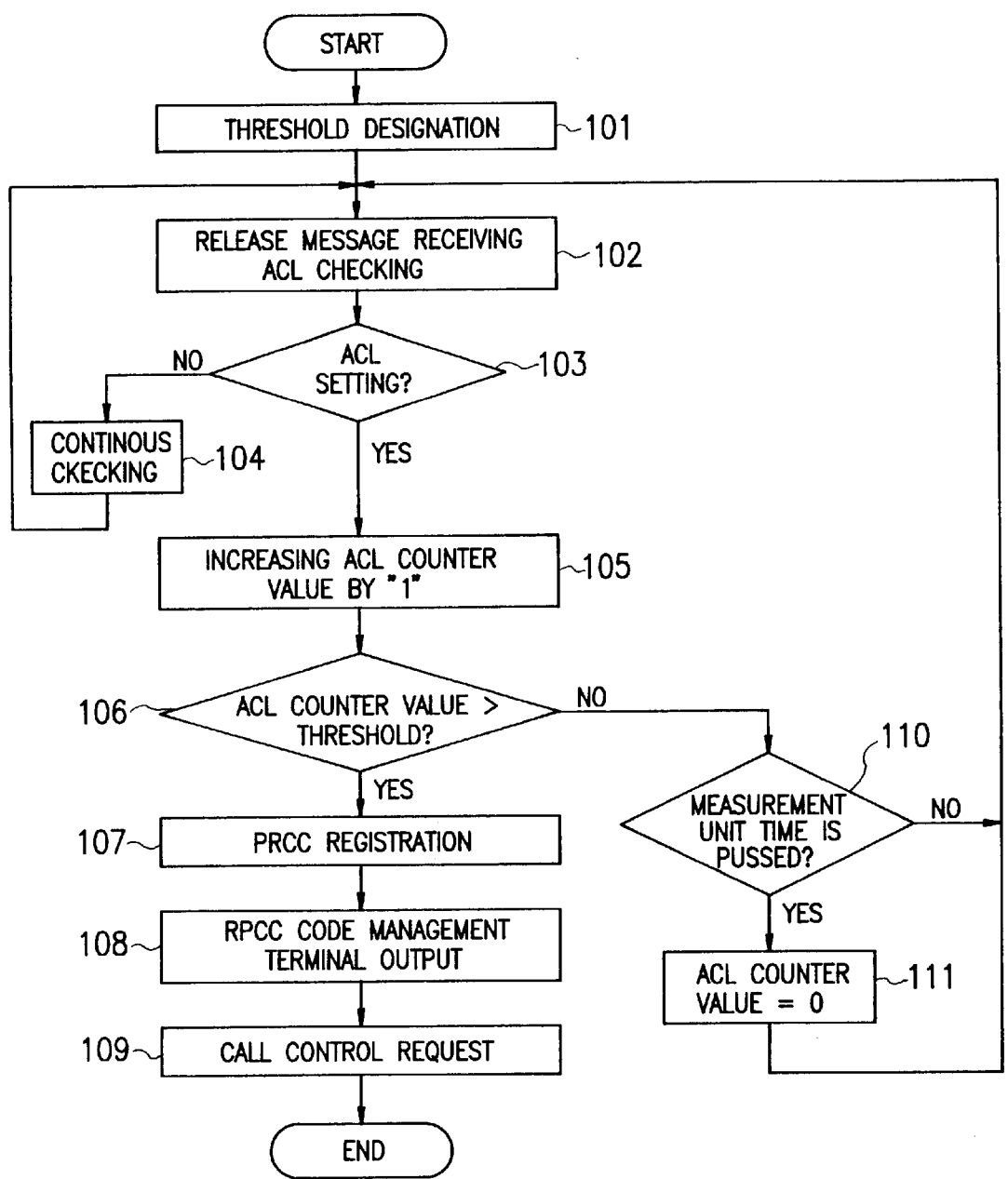

RARE PROBABILITY CONNECTION CALL REGISTRATION METHOD FOR ASYNCHRONOUS TRANSFER MODE SWITCHING SYSTEM

BACKGROUND OF THE INVENTION

1. Field of the Invention

The present invention relates to a rare probability connection call registration method for a mode switching system, and more particularly, to an improved rare probability connection call registration method for a mode switching system which is capable of using automatic congestion level (ACL) information within a release message.

2. Description of the Conventional Art

The phenomenon of traffic congestion of a communication network mostly occurs due to an overload in a receiving system. This communication congestion or the overload of the switching system occurs when many call services are requested at one time and therefore, communication traffic concentrated on a specific receiving system results in an unexpected communication failure.

When calls are concentrated at a predetermined time with respect to a specific receiving system (for example, reservations for public performance, or an audience response rating for a television program), the above-described heavy call concentration phenomenon may occur even when an operator of the switching system predicts such heavy call congestion if some special operations for the system is not made.

When a call request is heavily concentrated on a predetermined receiving number, when a large number of calls is concentrated on the destination beyond the design specification of the connection Admission Control function, the system can only offer limited service, and the system may go down due to the above-described problems.

FIG. 2 is a graph illustrating a performance variation when a switching system is overloaded.

As shown therein, the line "a" indicates a theoretical system performance which is obtainable when an overload of the system occurs or traffic congestion occurs, the curved line "c" denotes a system performance when the congestion control function is not operated, and the line "b" denotes the affordable system performance when the congestion control function is operated.

If the above-described situation is maintained, the system congestion resulting from many call attempts concentrated on a specific number may cause further congestion in a neighboring system. So, finally, there may occur system-wide failure.

In order to overcome the above-described problems, a conventional public switched telephone network (PSTN) is directed to check a traffic completion ratio with respect to an input candidate code (the traffic received for a specific code of a predetermined system), and when a call completion ratio of a corresponding code is less than a predetermined threshold value, the call with respect to the corresponding code is controlled.

That is, such method is directed to maximizing the efficiency of the network so that a call system resource may be evenly distributed except for the congested call by detecting a receiving code in which the call completion ratio is lower than that of a normal call, and controlling at least one of the receiving code in a transmitter in which a desired call attempt is possible or the switching system near a transmitting terminal. A call for which the completion ratio is lower is called a rare probability connection call (RPCC).

For a conventional PSTN, control with respect to the code in which the call completion ratio is much lower due to the congestion of a specific switching system is performed based on a result of statistical function after a lapse of a predetermined time after the congestion has occurred, so that a large amount of time is required for the control, and since the call completion ratio is controlled by only statistical data, if faults in the statistical function occur, an error may occur in the system.

In addition, when performing a function based on the candidate code, since the control is performed after a predetermined time after the operator inputs a predetermined code, it is impossible to prevent the call concentration problems due to unpredictable and sudden failure of the system in conventional methods.

SUMMARY OF THE INVENTION

Accordingly, it is an object of the present invention to provide an improved rare probability connection call registration method for an asynchronous transfer mode switching system which overcomes the problems encountered in the conventional art.

It is another object of the present invention to provide an improved rare probability connection call registration method for an asynchronous transfer mode switching system which is capable of using an automatic congestion level (ACL) information for a release message for an asynchronous transfer mode (ATM) switching system.

To achieve the above objects, there is provided an improved rare probability connection call registration method for an asynchronous transfer mode switching system which includes the steps of setting a predetermined threshold value, receiving a call releasing message, checking automatic congestion level (ACL) information contained in the call release message, and determining whether ACL information is set, continuously checking the ACL information when the ACL information is not set, increasing the count value when the ACL information is set, and determining whether the value of the ACL counter is greater than a predetermined threshold value. The method further includes the steps of registering a corresponding code as a rare probability connection call (RPCC) when the value of the counter is greater than the threshold value, outputting the corresponding code to an operator through an operator terminal, requesting call control with respect to the call request which is routed to the corresponding route, and clearing the value of the counter when the value of the counter is below the threshold value after the measurement unit time has passed.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a flow chart illustrating a rare probability connection call registration method according to the present invention.

DETAILED DESCRIPTION OF THE INVENTION

Figure 1:
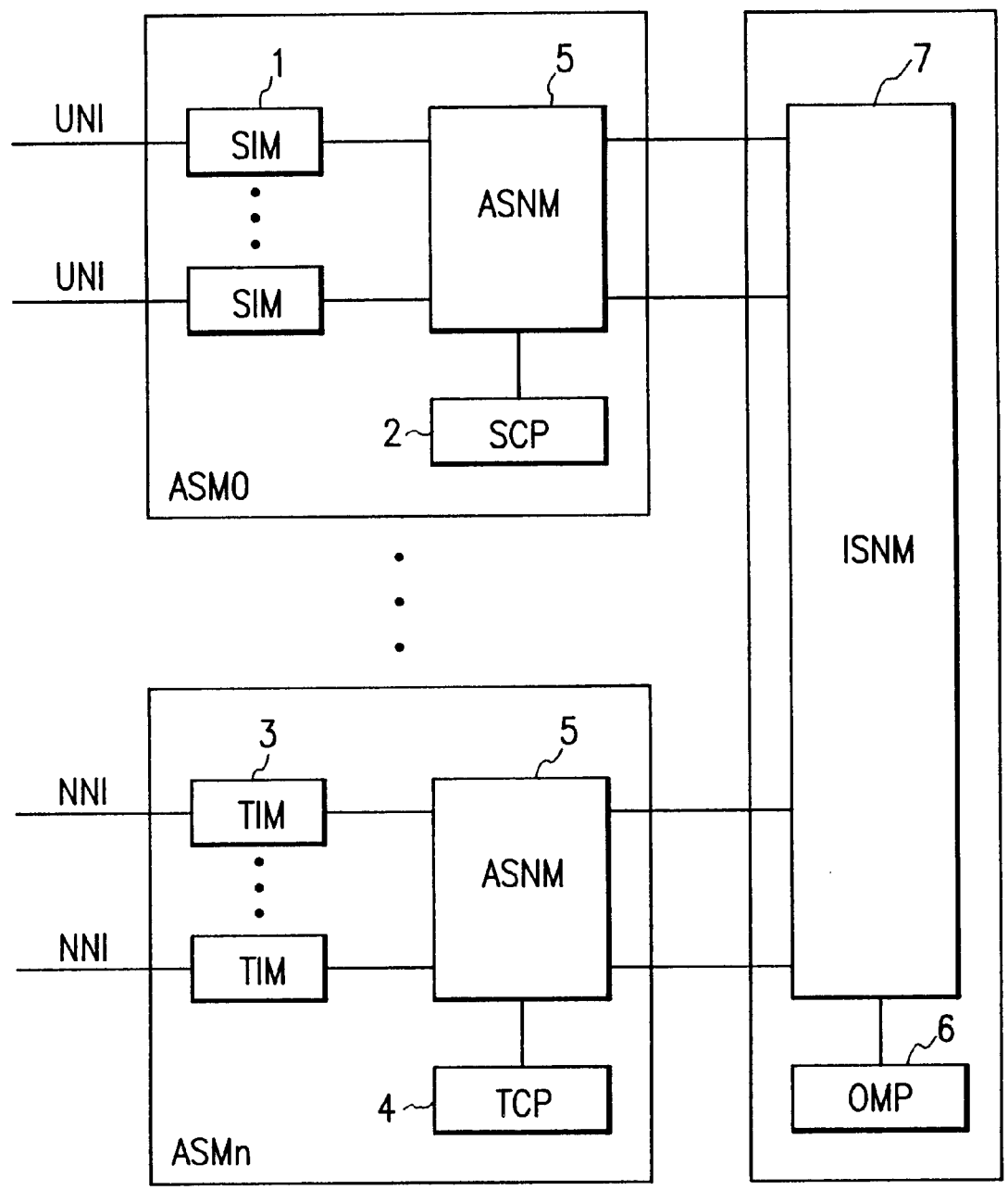
FIG. 1 is a block diagram illustrating an asynchronous transfer mode (ATM) switching system according to the present invention.
Figure 2:
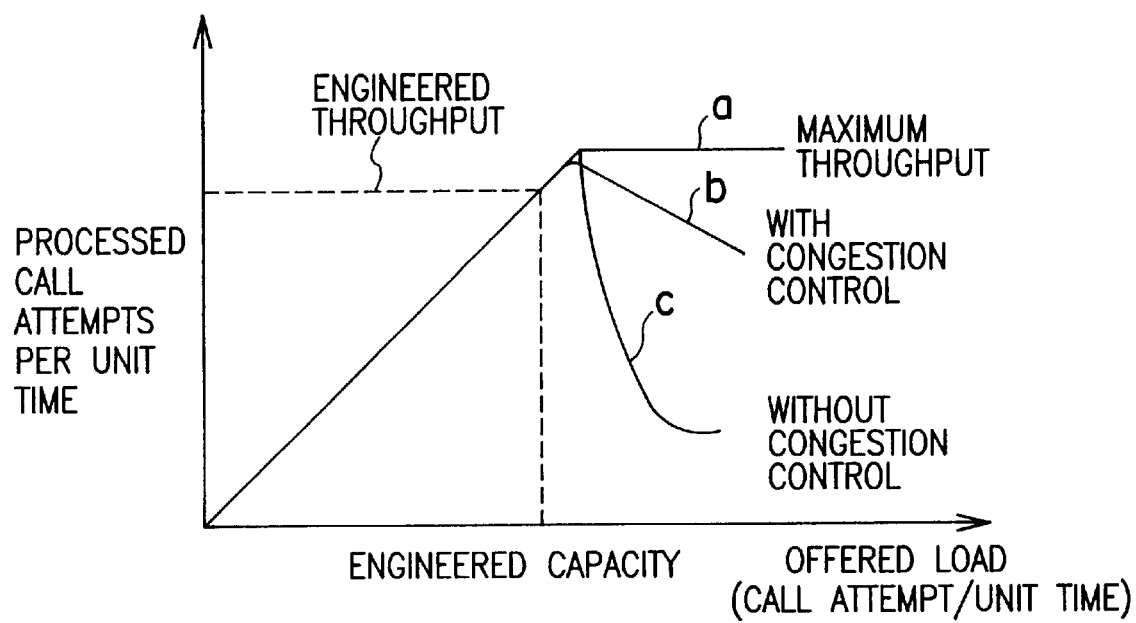
FIG. 2 is a graph illustrating a performance variation when a switching system is overloaded.

FIG. 1 is a block diagram illustrating an asynchronous transfer mode (ATM) switching system according to the present invention.

As shown therein, a subscriber call processor (SCP) 2 is a processor for processing a user's call which uses a user network interface (UNI) protocol and controls an entire traffic operation such as call receiving control, and a usage parameter control (UPC) in cooperation with a subscriber interface module (SIM) 1.

A trunk call processor (TCP) 4 is a process for processing a call with a network using a network node interface (NNI) protocol, performing call connection control with respect to an input relay and output relay call in cooperation with a trunk interface module (TIM) 3, and controlling entire functions which are necessary for an interface match with the network.

An operation and maintenance processor (OMP) 6 controls an operation- and maintenance-related function for the system, and is a processor for performing a charging process, a statistical process, a maintenance function, a management function, etc.

An access switch network module (ASNM) 5 is a self-routing switch in which there is no blocking in the switching system for transmitting a basic unit cell of the ATM, and performs a line concentration function having a predetermined line concentration ratio in accordance with the configuration system.

An interconnection switch network module (ISNM) 7 is a self-routing switch which is used as an interconnector between ATM switching modules (ASM).

Figure 3:
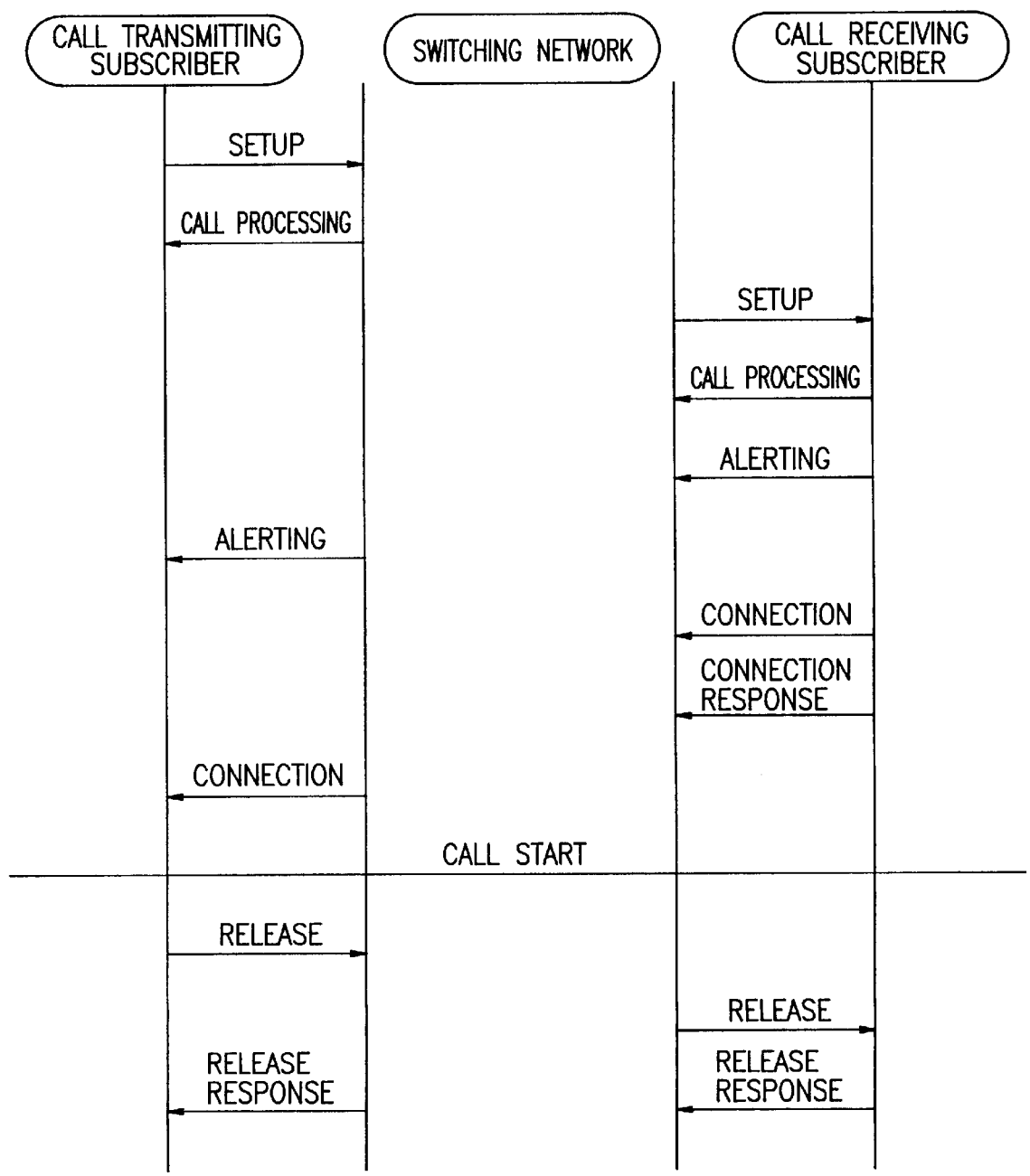
FIG. 3 is a view illustrating a signal process when a call service is requested in a broad integrated services digital network (B-ISDN) according to the present invention.

FIG. 3 is a view illustrating a signal process when a call service is requested in a broadband integrated services digital network (ISDN) according to the present invention.

A setup message is transmitted to the switching system during a call attempt by a subscriber, and in the switching system, a call processing message is transmitted to the subscriber if a relay line bandwidth exists with respect to the receiving number which the subscriber wants.

The setup message is transmitted to the subscriber (a destination side) through the relay system, and an altering message is transmitted if the subscriber has the same attribute of the terminal as the transmitting side of the subscriber. Thereafter, call service is attempted if a connection and a connecting response message are set up.

In addition, when a receiving call or a transmitting call are finished, a release message is transmitted.

After the setup message is transmitted, a network or a subscriber can always transmit a release message. The network may terminate the call when the subscriber disconnects the call during the connection trial thereof and network cannot receive a call request from the subscriber.

The congestion levels are divided into two levels in the proposed recommendations, and the congestion state with respect to corresponding switching components is indicated.

The present invention is directed to reducing the traffic to a corresponding switching component when the congestion in a specific switching component occurs, whereby the system failure is overcome by reducing the call load of the switching component. When the call to the corresponding route is terminated, and the ratio set with respect to the ACL information exceeds a predetermined threshold value of the entire route, since normal service is impossible due to the corresponding route failure, the call for routing to the corresponding route is rejected for the connection with a nearby switching system from the transmitting side, thus reducing the number of ineffective calls within the network, and the call load of the corresponding switching component is automatically recovered, to thereby remove the corresponding failure.

That is when the ratio indicating that congestion is occuring in the switching system of the call service exceeds a threshold value which the operator or the system designates, since it is possible to judge the call with respect to the corresponding route to be the RPCC, the call control with respect thereto is performed.

FIG. 4 is a flow chart illustrating a rare probability connection call registration method according to the present invention.

The present invention is directed to receiving a threshold value that the system previously designated or that the operator has input, and further setting a predetermined threshold value as seen in step 101. In addition, when the release message is received, the ACL information in the release message is checked in step 102, and it is judged whether the ACL information is set in step 103.

When the ACL information is not set, the checking process is continuously performed in step 104, and when the ACL information is set, the ACL count value is increased by "1" in step 105, and it is determined whether the value of the ACL counter exceeds a predetermined threshold value in step 106.

If the value of the ACL counter is greater than a predetermined threshold value, a corresponding code is registered as the RPCC in step 107 and is output through the operator terminal in step 108. Then call control is requested with respect to the call requesting which is routed to the corresponding route in step 109.

If the value of the ACL counter is below a predetermined threshold value, it is determined whether the measurement unit time has elapsed in step 110, and if the designated measurement unit time has passed, the ACL counter value is cleared to 0 in step 111, and the release message is continuously checked.

As described above, the rare probability connection call registration method for an asynchronous transfer mode switching system according to the present invention is directed to registering the RPCC by using the ACL information within the release message which is information indicating the traffic state of the network, whereby it is possible to more quickly control the network and restrict an ineffective call. In addition, it is possible to limit an ineffective call within a predetermined network by limiting the call service request toward the corresponding switching system at the transmitting side or the switching system which is located nearest from the transmitting side when a failure which the operator cannot predict occurs, thus maximizing the efficiency of the network.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A rare probability connection call registration method for an asynchronous transfer mode switching system, comprising the steps of:

setting a predetermined threshold value;

receiving a call releasing message;

checking automatic congestion level (ACL) information contained in the call release message;

determining whether ACL information is set;

continuously checking for the ACL information when the ACL information is determined to not be set;

increasing an ACL counter value when the ACL information is set;

determining whether the value of the ACL counter is greater than a predetermined threshold value;

registering a corresponding code as a rare probability connection call (RPCC) when the ACL counter value is greater than the threshold value;

outputting the corresponding code to an operator through an operator terminal;

requesting call control with respect to the call request which is routed to the corresponding route; and clearing value of the ACL counter when the ACL counter value is less than the threshold value after the measurement unit time has passed.

* * * * *